United States Patent [19]

Cocca

[11] Patent Number: 5,287,134
[45] Date of Patent: Feb. 15, 1994

[54] PHOTOGRAPHIC FLASH APPARATUS
[75] Inventor: J. David Cocca, Pittsford, N.Y.
[73] Assignee: Eastman Kodak Company, Rochester, N.Y.
[21] Appl. No.: 996,998
[22] Filed: Dec. 28, 1992
[51] Int. Cl.$^5$ .............................................. G03B 15/03
[52] U.S. Cl. ................................. 354/132; 354/145.1
[58] Field of Search ................. 354/132, 127.13, 145.1
[56] References Cited

U.S. PATENT DOCUMENTS

| | | | |
|---|---|---|---|
| 4,242,616 | 12/1980 | Takematsu | 315/241 |
| 4,384,238 | 5/1983 | Greenwald et al. | 315/151 |
| 4,705,373 | 11/1987 | Ohmori | 354/127.11 |
| 4,748,382 | 5/1988 | Walker | 315/240 |
| 4,908,552 | 3/1990 | Kumakura | 315/241 |
| 5,049,916 | 9/1991 | O'Such et al. | 354/412 |
| 5,055,865 | 10/1991 | Fujino et al. | 354/127.11 |
| 5,136,312 | 8/1992 | Weaver et al. | 354/132 |
| 5,146,258 | 9/1992 | Bell et al. | 354/432 |

Primary Examiner—Monroe H. Hayes
Attorney, Agent, or Firm—David M. Woods

[57] ABSTRACT

An electronic strobe flash apparatus includes a first energizable flash tube arranged to project light in a first direction to directly illuminate a scene, a second energizable flash arrange to project light in a second direction to indirectly illuminate the scene, a battery power supply for providing a source of charging energy, first and second high voltage discharge capacitors coupled to the first and second flash tubes, and electronic control means for providing charging current from the power supply to the first high discharge voltage capacitor until it is charged to a predetermined discharge voltage and for then charging the second high voltage discharge capacitor to the predetermined discharge voltage level. Preferably, the electronic control means includes a single DC/DC converter coupled through a miniaturized relay to the first and second high voltage capacitors to successively charge each under charge control signals provided by a microcontroller. The charging of the first high voltage discharge capacitor to the predetermined high voltage level takes place more rapidly than the charging of the second high voltage discharge capacitor, since the capacitance of the latter exceeds the capacitance of the former. Preferably, if the user of the camera attempts to depress the shutter release button to take a picture, the automatic exposure control system of the camera provides a warning to the user in the event that the second high voltage discharge capacitor is being charged so that the user can either wait until charging is complete or depress the shutter release button further and make an exposure employing only the direct flash unit. The preferred embodiment of the present invention provides for rapid recharging of the low-capacitance, high voltage discharge capacitor of the direct flash unit which may be sufficient under the circumstances and which avoids unnecessary charging of the large capacitance high voltage discharge capacitor of the indirect flash unit and consequent waste of battery energy. Preferably, a ceiling detector provides a control signal that inhibits charging of the indirect flash tube high voltage capacitor.

25 Claims, 4 Drawing Sheets

PHOTOGRAPHIC FLASH APPARATUS

FIELD OF THE INVENTION

The present invention relates to electronic strobe flash apparatus for a camera, and, more particularly, to a system for providing composite flash illumination comprising indirect (bounce) and direct (fill-in) flash of a subject from a single battery with priority given to direct flash.

BACKGROUND OF THE INVENTION

Electronic strobe flash systems mounted on or in a camera and involving the rapid discharge of a high voltage through a flash lamp synchronized with the exposure of an image frame are well-known in the photographic art. For a flash exposure of a scene, it is desirable to illuminate the scene indirectly so that it appears to be illuminated from above in a way characteristic of natural lighting and to illuminate the scene directly to soften dark shadows caused by obliquely directed light. The indirect illumination is commonly known as bounce flash, since the light is typically directed upward and bounced off a reflective ceiling and onto the scene, although it is also known to bounce the flash off a vertical wall or panel to provide side illumination. Flash light aimed directly at the scene is referred to as direct illumination or fill-in flash. Where natural illumination from above is available, such as in daylight outdoor scenes, direct or fill-in flash may be employed to soften shadows falling on the subject to be photographed. Conversely, in indoor scenes, where illumination from above is not available or does not possess natural light spectral characteristics, it is desirable to provide indirect illumination by bouncing flash light off a ceiling and onto the scene or subject to be photographed. In such situations, it is also desirable to provide direct illumination so as to again fill in shadows created by the downwardly directed bounce flash illumination. The combination of bounce and fill in flash illumination minimizes the undesirable effects of direct illumination alone, including harsh shadows, red eye, specular reflections, and high contrast or loss of tonal detail depending on the distance of subjects in the image. Unfortunately, indirect flash illumination requires much more energy than direct illumination due to light intensity loss by absorption and scattering by the ceiling or wall surface.

U.S. Pat. No. 4,242,616 describes a photographic flash apparatus for providing both fill-in and bounce flash illumination provided by a direct illumination flash bulb 17 and an indirect illumination flash bulb 19, which are simultaneously charged from a single battery 20 and a discharge capacitor 23. The high voltage capacitor 23 is discharged simultaneously through the flash tubes 17 and 19 synchronously with the operation of the camera shutter. By configuring the direct and indirect flash tubes differently and choosing appropriate circuit components, bounce flash illumination provided by the indirect flash tube 19 exceeds the fill-in illumination provided by the direct flash bulb 17. The amount of illumination provided is measured by a photo detector aimed at the scene, and both fill-in and bounce flash light is terminated simultaneously when a desired total reflection of light from the scene is achieved. A ratio of indirect to direct illumination of about 75:25 is sought in the operating example of the circuit described in the '616 patent.

U.S. Pat. No. 4,384,238 discloses an electronic strobe flash apparatus for bounce and fill in flash illumination of a scene also having direct and indirect flash tubes coupled in parallel to a charging capacitor, battery, DC/DC converter, and control circuit and to separate quenching circuits for separately halting discharge through each of the flash tubes. In the flash apparatus of the '238 patent, the control circuit is switched into operation synchronously with the camera shutter release and first causes the indirect flash lamp to discharge and emit bounce flash illumination on the scene. During a 40 microsecond period, a photo detector circuit measures the light reflected from the scene and, if the reflected light falls below a certain threshold indicating the absence of a suitable reflective ceiling surface, the bounce flash illumination is quenched and fill-in flash illumination is simultaneously commenced. If, however, the bounce flash illumination reflected from the scene is sufficiently high, then bounce flash illumination continues until the reflected light reaches a second threshold, whereupon bounce flash illumination is quenched and fill-in illumination is commenced. The photo detector and control circuit continues to monitor the accumulated reflected light and quenches fill-in illumination when the total measured illumination reaches a further threshold related to the film type and shutter speed. The user may override the control circuit by disabling bounce flash illumination when there is sufficient overhead illumination or when no ceiling is present.

A further U.S. Pat. No. 5,136,312 to Weaver et al, assigned to the assignee of the present invention, describes a direct and indirect flash illumination system wherein the presence of a suitable reflective ceiling surface is detected by light reflected therefrom is employed to control the ratio of indirect and direct illumination and, in conjunction with light reflected from the scene, total illumination. In one embodiment, an active radiation emitter transmits IR radiation upward in a manner such that a portion of the radiation is reflected back to a photo detector which provides a first signal containing information relating to the distance between the surface and the flash system as well as the quality of the reflective surface. A control system responsive to the signal causes both bounce and fill-in flash illumination when the indirect reflecting surface is within a predetermined distance and causes operation of only fill-in or direct flash illumination when the indirect reflecting surface is not within the predetermined distance. The first signal and a further signal developed by a photodetector aimed at the scene are employed in controlling total illumination by separately quenching the direct and indirect illumination.

In an alternative embodiment, a photo detector aimed upward is employed in a passive mode to detect bounce flash illumination reflected back from the ceiling, if present, in order to provide the first signal under the circumstances previously described. Thus, the '312 patent discloses a system which determines the presence or absence of a suitable reflective ceiling by measuring light reflected therefrom and controls bounce flash illumination in dependence thereon. Variable flash output and aperture selection can be combined in a single system to match the optical depth of field with the depth of illumination provided by the bounce and/or fill-in flash illumination. A quick recycle mode is also disclosed wherein bounce flash illumination is suppressed. In the various disclosed embodiments, when bounce flash illumination is allowed, it commences simultaneously with fill-in flash illumination, and the illumination from both the direct and indirect flash tubes is quenched either simultaneously or in an order dependent on the detected light returning from the scene in accordance with known exposure control algorithms.

In a further U.S. Pat. No. 5,055,865 to Fujino et al, a pair of separately controlled direct and indirect flash apparatus are disclosed which may or may not be incorporated into the camera body wherein bounce and fill-in illumination are provided of a scene under a number of operating algorithms. Preferably, the fill-in illumination is provided by a direct flash lamp, battery, charging circuit and control circuit, all incorporated in the camera body, and bounce illumination is provided by an indirect flash apparatus having a self-contained battery, charging capacitor and micro-computer based control system which may be mounted to hot-shoe of the camera body as if the camera had no internal flash apparatus. The various modes of operation include a charging subroutine illustrated in FIG. 7 where it appears that charging of the external and internal flash apparatus high voltage capacitors is triggered simultaneously and the priority of direct and indirect flash illumination may depend on which capacitor charges up first. The speed of charging the high voltage capacitor of the internal flash apparatus may be affected by prioritized allocation of current drawn from the battery for powering other camera functions, such as automatic focus and motorized film advance as shown in FIG. 17.

The "bounce surface" from which a flash of light can be bounced to illuminate a subject either below or beside the surface, such as a ceiling or a wall, typically varies considerably in reflectivity. Inherently, a large amount of the flash light directed at the bounce surface is either absorbed or reflected elsewhere than on the scene intended to be illuminated, particularly as the distance between the indirect flash lamp and the bounce surface increases. Due to the inherent dissipation of the bounce illumination, the indirect flash units have been designed to deliver two or three times as much illumination as the direct illumination flash lamps, as described above. Thus, the prior patents described above have emphasized the desirability of providing the bounce flash illumination first or at the same time as the fill-in flash illumination of the scene. Since the energy requirements for the bounce flash illumination well exceed the requirements for direct flash illumination, a problem arises in the time delay it takes to charge up a single high voltage capacitor to a voltage sufficient to deliver the required bounce flash illumination first. It would be desirable to decrease the time between successive exposures with the fill in flash and to avoid unnecessary charging of the high voltage capacitor for the bounce flash.

SUMMARY OF THE INVENTION

It is therefore an object of the present invention to provide a combined direct and indirect illumination photographic flash apparatus wherein at least the direct flash unit is readied and, if appropriate, allowed to deliver fill-in flash illumination in preference to the indirect flash unit.

In accordance with the present invention, an electronic strobe flash apparatus includes a first energizable flash tube arranged to project light in a first direction to directly illuminate a scene, a second energizable flash arranged to project light in a second direction to indirectly illuminate the scene, a battery power supply for providing a source of charging energy, first and second high voltage discharge capacitors coupled to the first and second flash tubes, and electronic control means for providing charging current from the power supply to the first high discharge voltage capacitor until it is charged to a predetermined discharge voltage and for then charging the second high voltage discharge capacitor to a predetermined discharge voltage level.

In accordance with a preferred embodiment of the present invention, the charging of the first high voltage discharge capacitor to the predetermined high voltage level takes place more rapidly than the charging of the second high voltage discharge capacitor, since the capacitance of the latter exceeds the capacitance of the former. Preferably, if the user of the camera attempts to depress the shutter release button to take a picture, the automatic exposure control system of the camera provides a warning to the user in the event that the second high voltage discharge capacitor is being charged so that the user can either wait until charging is complete or depress the shutter release button further and make an exposure employing only the direct flash unit.

As a further aspect of the present invention, an active range finder may be provided for verifying the presence of a bounce surface and, in the absence of an acceptable bounce surface, disabling the charging operation of the large capacitance, indirect flash, high voltage discharge capacitor. If a suitable bounce surface is detected, charging of the large capacitance, high voltage discharge capacitor is commenced, and the user is warned when he attempts to depress the shutter release button of the charging status of the indirect flash tube.

Advantageously, the preferred embodiment of the present invention provides for rapid recharging of the low-capacitance, high voltage discharge capacitor of the direct flash unit which may be sufficient under the circumstances and which avoids unnecessary charging of the large capacitance high voltage discharge capacitor of the indirect flash unit and consequent waste of battery energy.

Advantageously, the electronic control means includes a single DC/DC converter coupled through a miniaturized relay to the first and second high voltage capacitors to successively charge each under charge control signals provided by a microcontroller, thereby avoiding redundant DC/DC converters.

Other objects, advantages and features of the invention will become more apparent in the detailed description of the preferred embodiments thereof presented below.

BRIEF DESCRIPTION OF THE DRAWINGS

In the detailed description of the preferred embodiments of the invention presented below, reference is made to the accompanying drawings, in which.

DETAILED DESCRIPTION OF THE ILLUSTRATED EMBODIMENTS

Figure 1:
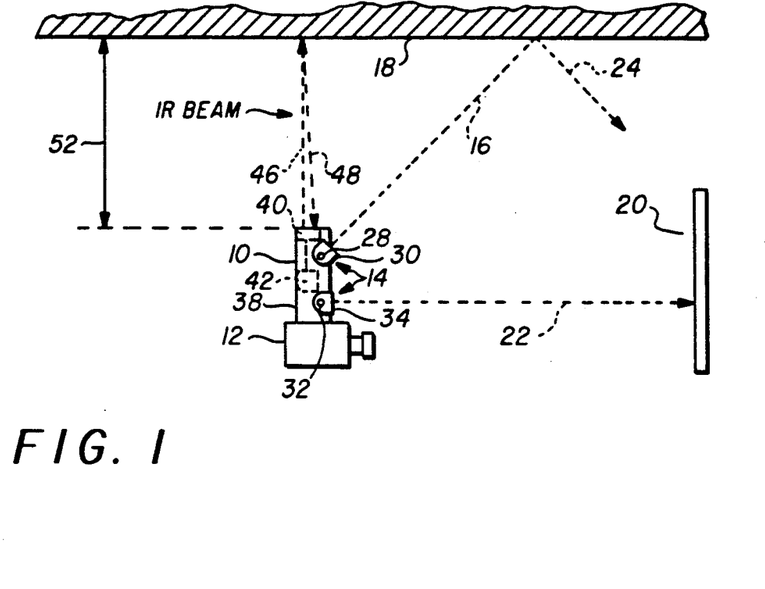
FIG. 1 is a diagrammatic view illustrating a camera and flash system of the prior art in which the present invention may be implemented.

Referring now to FIG. 1, there is shown a prior art flash system, corresponding to FIG. 1 of the '312 patent, in which the present invention may be implemented. In FIG. 1, the flash system, generally designated 10, provides artificial illumination for image capture and is shown in combination with a conventional camera 12. The flash system 10 includes sources of flash illumination generally designated 14 which operate selectively in a one mode for projecting light in a bounce flash path 16 toward an indirect reflecting surface 18 to illuminate a subject or scene 20 indirectly and in further mode for projecting light in a fill in flash path 22 to illuminate the subject 20 directly. Typically, indirect reflecting surface 18 is the ceiling in a room where the subject is being photographed.

In the flash system 10 shown in FIG. 1, flash illumination sources 14 comprises separate flash units for indirect and direct illumination. In particular, the indirect flash unit includes an indirect flash tube 28 and reflector 30 which are arranged to project a flash light beam in bounce flash path 16 toward indirect reflecting surface 18, i.e. upwardly in the arrangement shown in FIG. 1, so that upon refection from the surface 18 in reflected flash path 24, the subject can be illuminated indirectly in a way characteristic of the natural lighting of the sun. The direct flash unit includes a direct flash tube 32 and reflector 34 arranged to project a flash light beam directly at the subject 20 in fill-in flash path 22 to soften any dark shadows thereon. The direct and indirect flash unit illumination sources 14 are mounted on a housing 38.

In accordance with one embodiment of the present invention, flash system 10 comprises active range finder surface or ceiling detector 40 utilizing electromagnetic radiation reflected from indirect reflecting surface 18 directly to the surface detector 40 for providing a signal containing information about the indirect reflecting surface 18, and control means 42 for controlling the operation of the source 14 in the two modes as determined by the information in the signal from the surface detector 40. The surface detector 40 preferably includes an emitter-detector pair located on the surface of the housing 38 disposed toward surface 18 during use of camera 12.

In this embodiment of the present invention, the electromagnetic radiation received by an active range finder surface or ceiling detector 40 is infrared radiation emitted from an emitter source along an emitted beam path 46 in FIG. 1 to surface 18 from which it is reflected along a reflected beam path 48 to a detector element. The information about indirect reflecting surface 18 contained in the signal provided by surface detector 40 is the presence of absence of surface 18 within a predetermined distance from flash system 10. If the signal indicates the presence of surface 18, control means 42 causes operation of flash illumination sources 14 in both the first and second modes as will be described in detail presently. On the other hand, if surface 18 is not present, this information also contained in the signal causes control means 42 to operate flash illumination sources 14 only in the second or direct flash mode as will be described. In other words, if surface 18 is beyond the maximum distance which will permit effective indirect flash, indirect flash is not employed, and if surface 18 is at or within the maximum distance, indirect flash may be employed. The information contained in the signal provided by surface detector 40 can also include the actual distance 52 to surface 18, and this information combined with camera-subject ranging data can be utilized to provide automatic adjustment of flash output and camera settings and will be described presently.

In an illustrative system, the active range finder includes both the emitter-detector pair and on-chip circuitry that provides signal information relating to the distance 52 between indirect reflecting surface 18 and system 10 by a triangulation method. In particular, the emitter is a light-emitting diode which radiates pulsed infrared rays to surface 18, and the detector is a position sensitive detector. A right triangle is defined wherein the hypotenuse is path 48 shown in FIG. 1, the longer of the two legs is path 46, and the shorter leg is the distance between the center of the light emitting diode and the point where light along path 48 is incident on the position sensitive detector. The two legs are of course at right angels to each other. As the distance between system 10 and surface 18 varies, the point of incidence of the reflected infrared beam 48 on the position sensitive detector also will vary. The distance between system 10 and surface 18 is determined by the relationship $L = 1/x(f)(B)$ where L is the distance from the system 10, i.e. from the light emitting diode to surface 18, B is the distance between the centers of the light emitting diode and the position sensitive detector, f is the focal length between the position sensitive detector and its corresponding lens, and x is the distance between the point of incidence of the reflected beam 48 on the position sensitive detector and the center of the position sensitive detector. The variable x is a function of the distance between the light emitting diode and surface 18 and is determined in the following manner.

When infrared radiation is incident at a spot on the surface of the position sensitive detector, an electric charge proportional to the light energy is generated at the point of incidence which creates photo currents flowing in opposite direction from that spot. The photo current collected at spaced apart electrodes are inversely proportional to the distances between the spot and the electrodes, and from this the spot or position or location of incidence can be determined. From that, the variable x can be determined.

By way of example, a suitable emitter-detector pair and range finder circuit module is commercially available from Hamamatsu under the commercial designation Range Finder IC and which provides an output signal when surface 18 is in the range from about 1 to about 5 feet from system 10.

In order to determine if light levels necessitate the use of artificial flash light and to set the exposure conditions for non-flash exposures, the camera 12 is also provided with a light metering system of the type described, for example, in commonly assigned U.S. Pat. No. 5,146,258 to Bell et al, incorporated by reference herein in its entirety. The light intensity signals received thereby are processed to develop exposure control shutter speed and aperture settings in relation to the read-in photographic film type and speed in a manner taught by the commonly assigned U.S. Pat. No. 5,099,268 to O'Such, also incorporated by reference herein in its entirety.

Such a light meter photometric sensor or a separate photosensitive element may also be employed to detect flash light reflected from the scene during the emission of the direct and indirect flash light to effectively integrate the light and provide flash quench signals in the manner described, for example, in the '268 patent or the above-referenced '312 and '865 patents.

Figure 2:
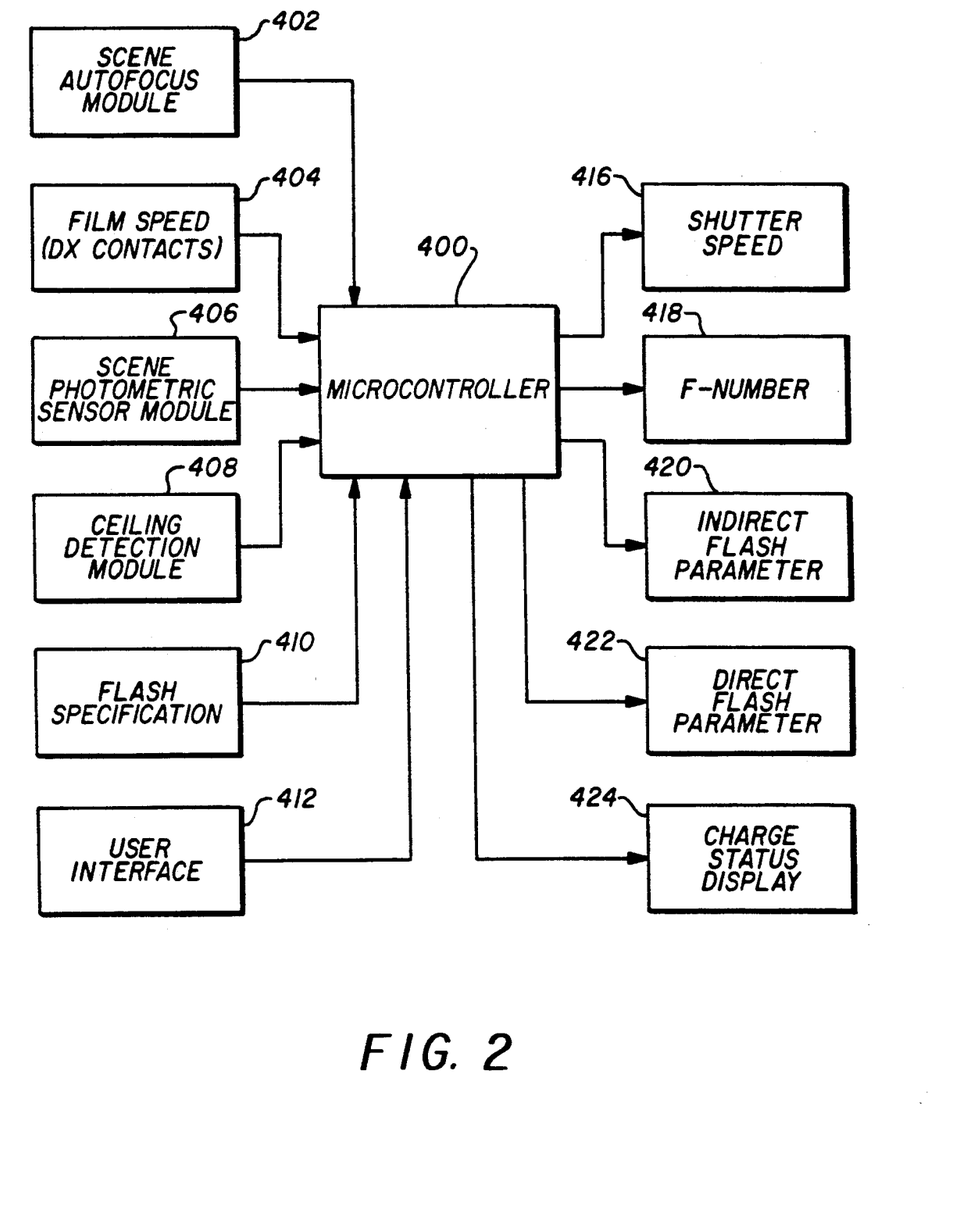
FIG. 2 is a system block diagram illustrating a microcontroller based camera utilizing the flash system and method of the present invention.
Figure 3:
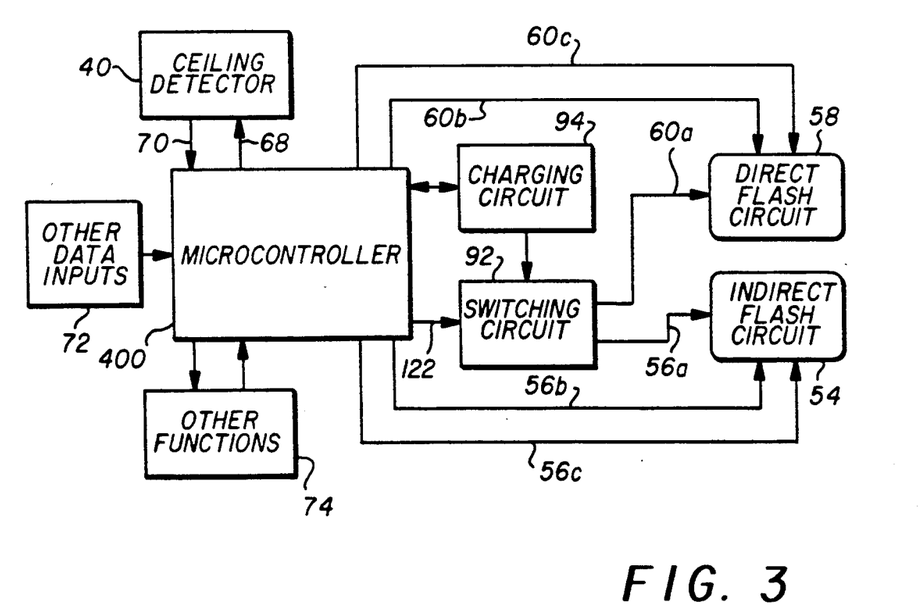
FIG. 3 is a charging system block diagram for the direct and indirect flash units of the system of FIG. 1 operated under control of the system of FIG. 2.
Figure 4:
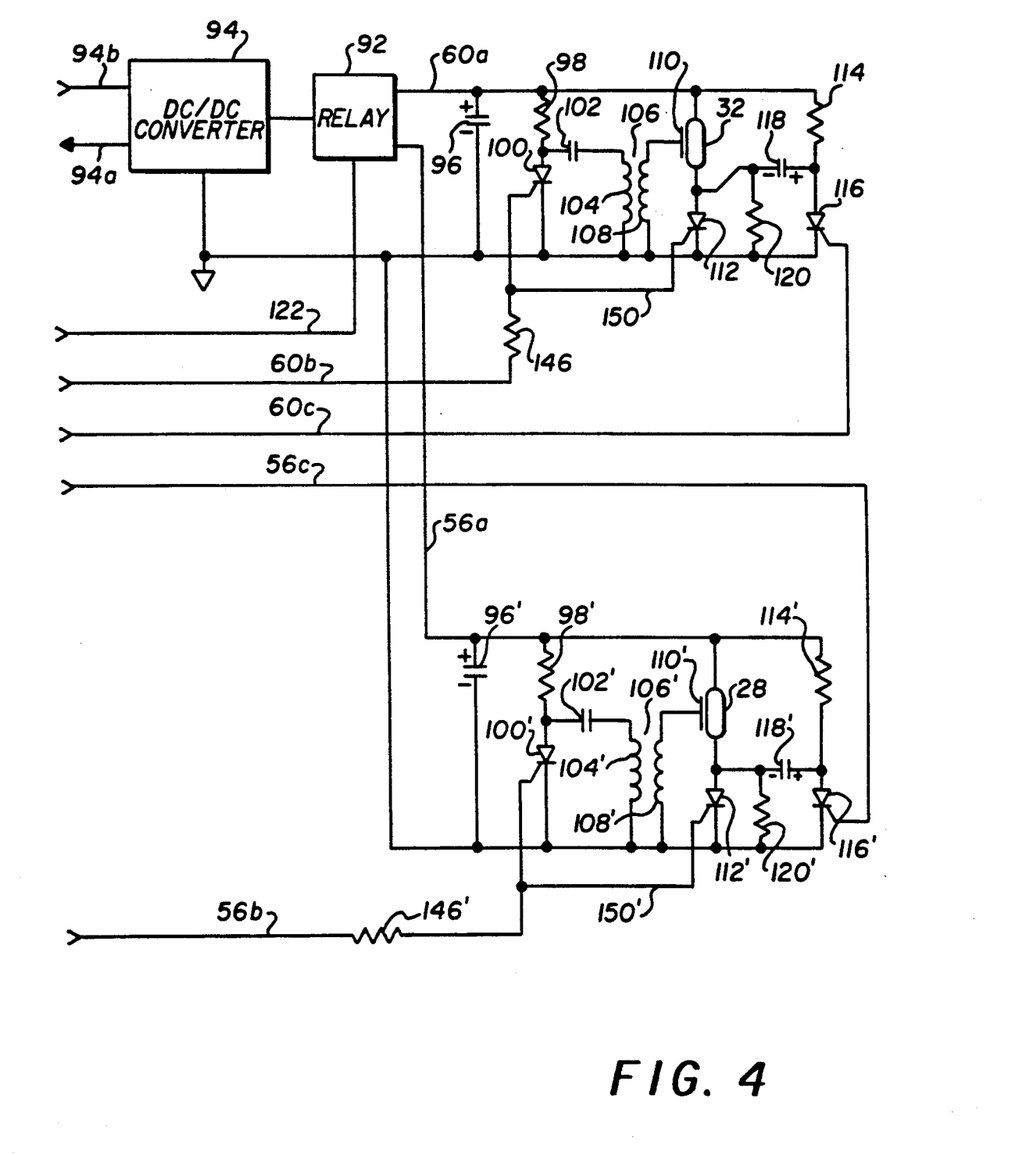
FIG. 4 is a schematic circuit diagram of the charging system according to the present invention which may be incorporated in FIG. 3.
Figure 5:
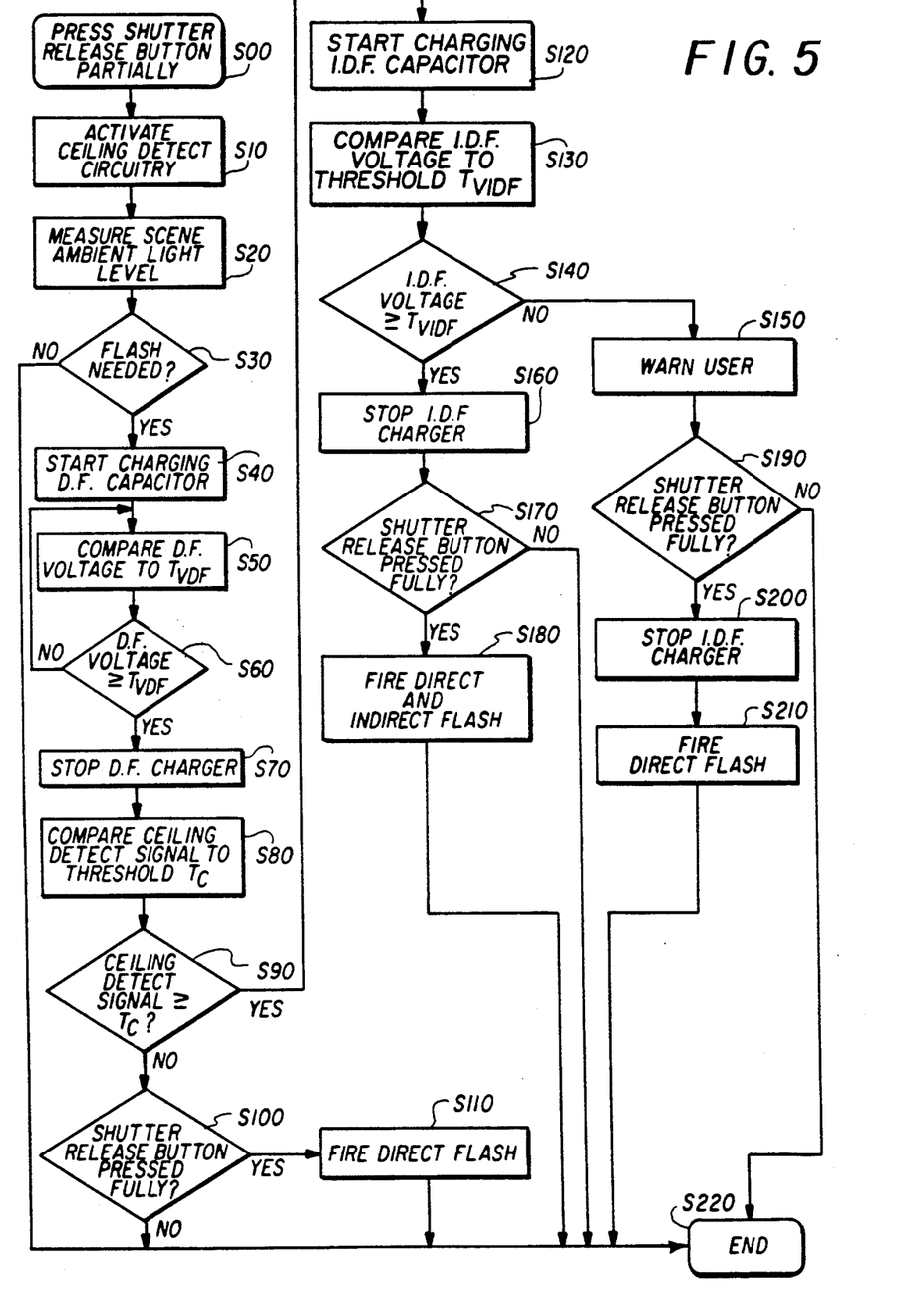
FIG. 5 is a program flow chart illustrating operation of the camera system of FIGS. 1-4.

FIG. 2 is a block diagram of a microcontroller/microcomputer based camera system utilizing the flash system and method described hereafter with reference to the flowchart of FIG. 5 for incorporation into the camera 12 and the flash charging block diagram and circuits of FIGS. 3 and 4. The microcontroller 400 receives a number of data signal inputs from sensors, modules or controls indicated in the blocks along the left-hand portion of FIG. 2. By way of example, in an illustrative camera system, a microcontroller capable of such implementation is the Motorola 68HC05 family. The autofocus module 402 is a ranging circuit providing scene/subject 20 distance information of the type employed, for example, in Kodak S1100 cameras. The film speed data input 404 is a signal obtained by reading coded conductive areas on the film cartridge (DX system) in a manner known to those skilled in the art. Scene photometric sensor module 406 provides the automatic exposure control signals or data by which the exposure parameters are set and may include feedback control signals for developing flash quench signals, although other data inputs related to shutter operation may be employed as described above to develop discharge and quench signals. The ceiling or indirect reflecting surface detection module 408 corresponds to active range finder detector 40 described above or other ceiling detector embodiments described in the above-incorporated '312 patent. User interface 412 represents input selections or commands such as no flash, rapid recycle or, in accordance with the present invention, no indirect flash commands. The flash specifications, i.e. hard-wired information of maximum flash output expressed as the guide number, where guide number equals the product of subject distance and F-stop number, which yields normal exposure may also be input via block 410 to the microcontroller 400.

The microcontroller 400 provides various control signals to the output blocks and modules indicated along the right-hand portion of FIG. 2. Shutter speed 416 and F-stop number 418 are control signals supplied to effect exposure control of the camera as is well understood by those skilled in the art. Indirect and direct flash parameters 420 and 422 include charge, discharge and quench control parameters described hereafter with respect to FIGS. 3–5. The charge status display module 424 provides the flash capacitor charge status signals to the user, preferably in the view finder window. Other user displays may be provided, including display of the current date data that may be exposed on the margins of the film, the number of exposures made, the exposure parameters, etc. as is known in the art.

As shown in the flash charging system block diagram of FIG. 3, the above described camera operating system microcomputer or microcontroller 400 is operatively connected to the first or direct and second or indirect flash circuits 54 and 58, the "other data inputs" block 72, the "other camera functions" block 74, and the ceiling detector 40. In particular, indirect flash tube 28 of FIG. 1 and its associated operating circuits are collectively designated indirect flash circuit 54, and flash control signals for operating the same are transmitted thereto from microcontroller 400 via indirect flash control lines 56a–56c. Similarly, direct flash tube 32 of FIG. 1 and its associated operating circuit are collectively designated direct flash circuit 58, and flash control signals for operating the same are transmitted thereto from microcontroller 400 via direct flash control lines 60a–60c. The other data inputs block 72 and other camera functions block 74 includes the other input and control signals and camera functions and operations attendant to the camera that are provided to or controlled by the microcontroller 400 as described above in regard to FIG. 2.

A command or enabling signal is sent from microcontroller 400 via emitter control line 68 to the ceiling detector 40 to trigger emission of the infrared radiation beam, and the signal developed by the detector of the emitter-detector pair is sent to microcontroller 400 via detector output line 70. The other data inputs block 72 includes the output signal from the scene photometric sensor module 406 mounted on camera 12 for exposure control which also can be compared with a threshold to determine if flash illumination is desirable. A second signal developed by the scene autofocus module 402 for automatic focus control may also be employed to determined whether the subject 20 is within the distance range of the flash illumination sources 14. A further signal provides synchronization information relating to shutter release for timing the flash illumination period to shutter opening.

FIG. 4 is a circuit diagram of the indirect and direct flash circuits 54 and 58 and the DC/DC converter 94 and switching relay 92 for charging and discharging the indirect and direct flash unit high voltage capacitors 96' and 96 in response to control signals from microcontroller 400. Turning first to the charging portions for charging the high voltage capacitors 96 and 96', the positive terminal of a battery is connected through a switch (not shown) to the power input line 94b of the DC/DC converter 94, the output of which is connected to the relay 92 which has two output terminals. The electronic relay 92 is operated by a switch control signal on switch control line 122 developed by the microcontroller 400 to connect the DC/DC converter 94 to the high voltage capacitor charge lines 60a or 56a and thereby to the direct and indirect flash unit high voltage capacitors 96 and 96'.

As shown, the DC/DC converter 94 output is connected through relay 92 to charge line 60a and the direct flash high voltage capacitor 96. A trigger circuit for direct flash tube 32 includes the series combination of resistor 98 and discharge trigger SCR 100 connected across main capacitor 96. The junction between resistor 98 and the anode of SCR 100 is connected to one terminal of a coupling capacitor 102, the other terminal of which is connected to one end of the primary winding 104 of a trigger transformer 106, the other terminal of which is connected to the cathode of discharge trigger SCR 100. The secondary winding 108 of trigger transformer 106 is connected to the electrode 110 of direct flash tube 32. One terminal of flash tube 32 is connected to the junction of resistor 98 and direct flash unit high voltage capacitor 96, and the other terminal of flash tube 32 is connected to the anode of an SCR 112, the cathode of which is connected to the cathode of SCR 100 for conduction therewith. The flash tube 32 is triggered into conduction and emits flashlight during the discharge of the high voltage capacitor 96 therethrough in response to a direct flash trigger signal provided from microcontroller 400 on discharge control line 60b.

Direct flash quenching is accomplished by conduction of the series combination of quench resistor 114 and SCR 116 which is connected across the series combination of direct flash tube 32 and SCR 112. A quench capacitor 118 is connected between the anodes of SCR 116 and SCR 112. A resistor 120 is connected across SCR 112. Quenching signals developed by the microcontroller 400 are applied via quench control line 60c to the gate of quench SCR 116. The quenching signals are developed in a manner well known in the art in response to the integrated indirect and/or direct scene illumination detected by a photosensor aimed at the scene 20 and other parameters of the film speed and exposure afforded by the exposure control system of the camera.

As shown in FIGS. 3 and 4, the output of the ceiling detection module 40, which is a signal indicative of the distance 52 to surface 18, is processed internally to provide a switch control signal for controlling the operation of relay 92 on switch control line 122 to switch the DC/DC converter 94 output from direct flash high voltage capacitor charge line 60a to indirect flash high voltage capacitor charge line 56a. The switching algorithm is described hereafter in conjunction with the flowchart of FIG. 5. Generally, it involves providing a first switch control signal to make the depicted switch position, monitoring the state of charge of the capacitor 96 on charge state line 94a, in a manner well known in the DC/DC converter art, and providing a second switch control signal on line 122 to connect the switch contacts to line 56a and to commence charging of the indirect flash high voltage capacitor 96'. Again, the state of charge is monitored on charge state line 94a, and a signal is generated in a display visible to the user indicating the state of charge of the indirect flash high voltage capacitor, so that the user may either wait until the charging is complete or disregard the display and make the exposure using only the direct flash unit. Upon making the exposure, the first switch control signal is again generated to reconnect the DC/DC converter 94 to the line 60a to recharge the direct flash high voltage capacitor 96 in the shortest time possible between exposures. The user may therefor make a series of exposures quickly using only the direct flash unit or wait a bit between exposures and use both the direct and indirect flash sources 14 when a reflective surface 18 is available. The operative steps described may be implemented in part in hard-wired logic circuits or preferably in software routines processed by the microprocessor of the microcontroller 400 as described hereafter.

The portion of the indirect flash circuit 54 for charging the indirect flash high voltage capacitor 96' and discharging it through the indirect flash tube 28 is substantially similar to the direct flash circuit 58 described above. Accordingly, like components are identified by the same reference numerals with prime designations. An indirect flash command or fire signal on discharge control line 56b is applied through resistor 146' to the gate of indirect flash discharge trigger SCRs 100' and 112'. Quenching signals are applied via quench control line 56c to the gate of quench SCR 116'. As in the direct flash circuit 58, the sources of quenching signals utilize distance information and light returning from the scene, all in a manner which is well known to those skilled in the art.

In operation, when flash illumination is permitted, and the presence of the indirect surface 18 is to be checked for possible indirect illumination, emitter-detector pair of the ceiling detector operates to emit infrared radiation along path 46 to surface 18, to receive infrared radiation reflected from surface 18 along emitted beam path 48 and to provide an output signal indicative of the presence of and distance 52 between surface 18 and the active surface detector 40 in a manner which will be described in detail presently.

Battery power is applied to DC/DC converter 94 with relay 92 in the position depicted in response to operation of the appropriate control on camera 12 in a known manner. DC/DC converter 94 produces an output current for first charging direct flash unit high voltage capacitor 96 to a voltage level substantially equal to the converter output voltage in a known manner. Capacitor 102 charges to a voltage level below that of capacitor 96 determined by the magnitude of resistor 98. Capacitor 118 also charges to the polarity indicated in FIG. 4.

As described more fully in the above-incorporated '312 patent, if the indirect reflecting surface 18 is within the required predetermined distance from flash system 10, the microcontroller 400 produces a switching signal to be applied on line 122 after capacitor 96 is fully charged or a preset time elapses from the start of charge. When the operator of camera 12 activates the exposure control, the state of charge of capacitors 96 and 96' is monitored on charge status line 94a. If capacitor 96 is fully charged, but capacitor 96' is being charged, that condition is displayed to the user. The user may decide to override the microcontroller 400 by fully depressing the shutter release button.

If the shutter release button is fully depressed, a flash trigger signal is applied through current limiting resistor 146 simultaneously to the gates of direct flash discharge trigger SCRs 100 and 112 turning both devices on. Capacitor 102 discharges through SCR 100 and primary winding 104 of transformer 106, and this discharge produces a high voltage pulse across the transformer secondary winding 108 for triggering or ionizing direct flash tube 32 in a known manner. Then, with flash tube 32 and SCR 112 conducting concurrently, capacitor 96 discharges through flash tube 32 and SCR 112 causing the flash tube to produce the direct flash. Thereafter, when a quench command signal occurs on quench control line 60c, quench SCR 116 is turned on, reversing the voltage across capacitor 118 and turning off SCR 112 and thereby quenching direct flash tube 32. Resistor 120 prevents a flow of current which during operation of flash tube 32 would tend to turn off SCR 112 thereby causing premature quenching.

The operation of the portion of the indirect flash circuit 54 associated with indirect flash tube 28 is substantially similar. When a signal on discharge control line 56b is applied through current limiting resistor 146' to the gates of SCRs 100' and 112', it causes operation of indirect flash tube 28 in a manner similar to the operation of direct flash tube 32. Thereafter, when a quench command signal appears on quench control line 56c, indirect flash tube 28 is quenched in a manner similar to that of direct flash tube 32.

Thus, when indirect reflecting surface 18 is within a predetermined distance or range of system 10, the circuit of FIG. 3 operates to charge and fire both indirect flash tube 28 and direct flash tube 32 under control of the microcontroller 400. However, when indirect reflecting surface 18 is not present or is beyond the predetermined distance, indirect flash tube 28 is not fired and only direct flash tube 32 is fired.

By way of example in an illustrative circuit, the camera battery provides three volts or six volts output depending upon the camera system configuration, the output of converter 94 is about 330 volts, high voltage capacitors 96 and 96' charge up to a voltage of about 330 volts, capacitors 102 and 102' charge to about 280 volts, and the primary to secondary turns ratio of trigger transformer 106 and 106' is about 1:50. The relay 92 is preferably a miniature electromagnetic relay that is rated for greater than about 200 mA charging current and a 400 V breakdown voltage rating and may be switched between a neutral position disconnected from both lines 56a and 60a and the two energized positions described above. The DC/DC converter 94 may take the form of a conventional flyback oscillator and rectifier circuit of the type disclosed in U.S. Pat. Nos. 4,272,806, 5,068,575 and 5,101,335. The values of capacitors 96' and 96 are preferably 500 microfarads and 120 microfarads, respectively.

FIG. 5 is a program flow chart illustrating the operation of the system of FIGS. 1-4 in the implementation of the various embodiments of the present invention. The method shown in the flow chart of FIG. 5 relies on fixed light output (at two different levels) from the indirect and direct flash tubes. If a suitable indirect reflecting surface is not detected, the direct tube fires and a camera aperture based on the subject distance and reflected integrated scene light is selected. If a suitable indirect reflecting surface is detected and if the operator waits until the indirect high voltage capacitor is charged, both tubes fire.

In FIG. 5, at PARTIAL SHUTTER RELEASE block S00, shutter activation is commenced, e.g. by partial depression to wake up the microprocessor and commence the ceiling detection operation in the ACTIVATE CEILING DETECT block S10. At MEASURE SCENE block S20, the photometric array output signals are processed in conjunction with known stored algorithms, the exposure parameter limits of the camera and the read-in film speed. At FLASH NEEDED? decision block S30, the camera indicates the need for flash illumination, and assuming that it is needed or is overridden by a user interface command, the first or direct flash high voltage capacitor charging is commenced in D.F. CAPACITOR CHARGING block S40.

The charging voltage of the direct flash capacitor is compared to a voltage threshold $T_{VDF}$ in COMPARE block S50. Charging is halted in block S70 when the direct flash capacitor is fully charged as determined in COMPARE decision block S60.

In COMPARE block S80, the ceiling reflected signal is compared to the threshold $T_c$, and if it is absent (no ceiling) or too low as determined in decision block S90, then only the first or direct flash unit is fired in FIRE DIRECT FLASH block S110 (assuming full depression of the shutter has taken place as determined in decision block S100).

If the ceiling is present at an acceptable distance and reflectivity, then the charging of the second or indirect flash high voltage capacitor is commenced in block S120. The full depression of the shutter release by the user may interrupt charging of the indirect flash capacitor at any time during its charging until it is fully charged. The voltage on the high voltage indirect flash capacitor is compared in COMPARE block S130 and decision block S140 to a further voltage threshold $T_{VIDF}$, and, until full charge is reached, a warning or charge status signal is displayed to the user in the WARN USER block S150. When full charge is reached, charging of the indirect flash capacitor is halted in the STOP CHARGE block S160 and the state of the shutter release is monitored in decision block S170. When it is fully depressed, both the direct and indirect flash tubes are fired in block S180 by discharging the capacitors 96 and 96' as described above.

Assuming that the user does override by fully depressing the shutter release button before charging is complete as determined in decision block S190, then charging of the indirect flash capacitor is halted in block S200 and only the direct flash tube is fired in block S210. The fire control and quenching of the tubes takes place thereafter as described above.

The algorithm as set forth in FIG. 5 is illustrative of the steps that may take place in somewhat different sequence as long as the low capacity direct flash capacitor is charged first by the single battery and the user is given the opportunity to override the continued charging and discharge of the indirect flash capacitor.

The variable output capability also permits the addition of another unique feature, a quick recycle mode. If maximum flash range is not desired the system may be configured, as in the flow diagram of FIG. 5, such that selection of a direct-flash-only mode results in a lower power output and larger lens aperture. As a result, the direct flash capacitor will recover much sooner and flash recycle times will be reduced significantly. The reduction in recycle times will permit rapid fire flash photography.

Thus, the system and method of FIGS. 1-5 advantageously removes the decision process from the selection of direct and indirect flash illumination and prioritizes the charging of the high voltage capacitors of the direct and indirect flash units so that the user can decide to sacrifice the benefits of the indirect flash illumination in favor of rapid cycling for repetitive exposures.

It is therefore apparent that the present invention accomplishes its intended objects. While embodiments of the present invention have been described in detail, that is for the purpose of illustration, not limitation.

What is claimed is:

1. A capacitive discharge flash apparatus for a camera comprising:

a first energizable flash tube arranged to project light in a first direction to directly illuminate a scene;

a second energizable flash tube arranged to project light in a second direction to indirectly illuminate the scene;

power supply means for providing a source of charging energy;

first and second high voltage discharge capacitors coupled to said first and second flash tubes, respectively;

control means for first coupling charging energy from the power supply means to said first high discharge voltage discharge capacitor and for then coupling charging energy from said power supply means to said second high voltage discharge capacitor; and interrupt means for disabling the charging of said second high voltage discharge capacitor and for discharging said first high voltage discharge capacitor through said first energizable flash tube.

2. The capacitive discharge flash apparatus of claim 1 further comprising:
   means for detecting the presence or absence of a suitable reflecting surface in said second direction from which flash illumination may be bounced onto said scene;
   means responsive to the detected presence of a suitable reflecting surface for
   means responsive to the detected absence of said suitable reflecting surface for inhibiting the charging of said second high voltage discharge capacitor after charging of said first high voltage discharge capacitor.

3. The capacitive discharge flash apparatus of claim 2 wherein said interrupt means further comprises:
   user interface means for inhibiting or interrupting the charging of said second high voltage discharge capacitor and for discharging said first high voltage discharge capacitor through said first energizable flash tube.

4. The capacitive discharge flash apparatus of claim 3 wherein said power supply means further comprises:
   a low voltage power source;
   a voltage converter for converting the low voltage provided by the low voltage power source to a high voltage; and
   switching means coupled to said voltage converter and selectively actuable by said control means for first connecting said voltage converter to said first high voltage discharge capacitor and then to said second high voltage discharge capacitor.

5. The capacitive discharge flash apparatus of claim 1 wherein said interrupt means further comprises:
   user interface means for inhibiting or interrupting the charging of said second high voltage discharge capacitor and for discharging said first high voltage discharge capacitor through said first energizable flash tube.

6. The capacitive discharge flash apparatus of claim 5 wherein said user interface means further comprises:
   display means for indicating to the user that said second high voltage discharge capacitor is charging; and
   means for triggering discharge of said first high voltage discharge capacitor during the operation of the display means.

7. The capacitive discharge flash apparatus of claim 1 wherein said power supply means further comprises:
   a low voltage power source;
   a voltage converter for converting the low voltage provided by the low voltage power source to a high voltage; and
   switching means coupled to said voltage converter and selectively actuable by said control means for first connecting said voltage converter to said first high voltage discharge capacitor and then to said second high voltage discharge capacitor.

8. The capacitive discharge flash apparatus of claim 7 wherein said interrupt means further comprises:
   means for detecting the presence or absence of a suitable reflecting surface in said first direction from which flash illumination may be bounced onto said scene; and
   means responsive to the detected absence of said suitable reflecting surface for selectively controlling said switching means to disconnect said voltage converter from said first and said second high voltage discharge capacitors after charging of said first high voltage discharge capacitor.

9. The capacitive discharge flash apparatus of claim 7 wherein said interrupt means further comprises:
   user interface means for inhibiting or interrupting the connection of said second high voltage discharge capacitor with said voltage converter by said switching means and for discharging said first high voltage discharge capacitor through said first energizable flash tube.

10. The capacitive discharge flash apparatus of claim 9 wherein said user interface means further comprises:
    display means for indicating to the user the state of charge of said second high voltage discharge capacitor.

11. A method of operating a capacitive discharge flash apparatus for a camera comprising the steps of:
    providing a first energizable flash tube arranged to project light in a first direction to directly illuminate a scene;
    providing a second energizable flash tube arranged to project light in a second direction to indirectly illuminate the scene;
    providing first and second high voltage discharge capacitors coupled to said first and second flash tubes, respectively;
    charging said first high voltage discharge capacitor to a predetermined energy level;
    detecting the presence or absence of a reflective surface from which light projected by said second energizeable flash tube in said second direction may be reflected onto the scene;
    selectively charging said second high voltage discharge capacitor to a predetermined energy level upon completion of charging of said first high voltage discharge capacitor and upon detection of the presence of a reflective surface from which light projected by said second energizable flash tube may be reflected onto said scene; and
    discharging said first and second high voltage discharge capacitor through said first and second energizable flash tubes to directly and indirectly illuminate the scene.

12. The method of operating the capacitive discharge flash apparatus of claim 11 further comprising the steps of:
    selectively overriding said selective charging step to inhibit the charging of said second high voltage discharge capacitor; and
    discharging said first high voltage discharge capacitor through said first energizable flash tube to directly illuminate the scene.

13. The method of operating the capacitive discharge flash apparatus of claim 12 further comprising the step of:
    indicating to the user the state of charging of said second high voltage discharge capacitor.

14. A method of operating a capacitive discharge flash apparatus for a camera comprising the steps of:
    providing a first energizable flash tube arranged to project light in a first direction to directly illuminate a scene;
    providing a second energizable flash tube arranged to project light in a second direction to indirectly illuminate the scene;
    providing first and second high voltage discharge capacitors coupled to said first and second flash tubes, respectively;

charging said first high voltage discharge capacitor to a predetermined energy level;

detecting a user initiated interrupt signal;

selectively charging said second high voltage discharge capacitor to a predetermined energy level upon completion of charging of said first high voltage discharge capacitor and unless an interrupt signal is detected before completion of charging of said second high voltage discharge capacitor; and discharging said first and second high voltage discharge capacitors through said first and second energizable flash tubes to directly and indirectly illuminate the scene upon completion of charging of said first and second high voltage discharge capacitors; or discharging said first high voltage discharge capacitor through said first energizable flash tube to directly illuminate the scene upon completion of charging of said first high voltage discharge capacitor and detection of an interrupt signal prior to completion of charging of said second high voltage discharge capacitor.

15. The method of operating the capacitive discharge flash apparatus of claim 14 further comprising the step of:

indicating to the user the state of charging of said second high voltage discharge capacitor.

16. The method of operating the capacitive discharge flash apparatus of claim 14 further comprising the steps of:

detecting the presence or absence of a reflective surface from which light projected by said second energizeable flash tube in said second direction may be reflected onto the scene;

selectively charging said second high voltage discharge capacitor to a predetermined energy level upon completion of charging of said first high voltage discharge capacitor and upon detection of the presence of a reflective surface from which light projected by said second energizable flash tube may be reflected onto said scene.

17. The method of operating the capacitive discharge flash apparatus of claim 16 further comprising the step of:

indicating to the user the state of charging of said second high voltage discharge capacitor.

18. A capacitive discharge flash apparatus for a camera comprising:

a first energizable flash tube arranged to project light in a first direction to directly illuminate a scene;

a second energizable flash tube arranged to project light in a second direction to indirectly illuminate the scene;

first and second high voltage discharge capacitors coupled to said first and second flash tubes, respectively;

means for charging said first high voltage discharge capacitor to a predetermined energy level;

means for detecting the presence or absence of a reflective surface from which light projected by said second energizeable flash tube in said second direction may be reflected onto the scene;

means for selectively charging said second high voltage discharge capacitor to a predetermined energy level upon completion of charging of said first high voltage discharge capacitor and upon detection of the presence of a reflective surface from which light projected by said second energizable flash tube may be reflected onto said scene; and means for discharging said first said first and second high voltage discharge capacitor through said first and second energizable flash tubes to directly and indirectly illuminate the scene.

19. The capacitive discharge flash apparatus of claim 18 further comprising:

means for selectively overriding said selective charging step to inhibit the charging of said second high voltage discharge capacitor; and means for discharging said first high voltage discharge capacitor through said first energizable flash tube to directly illuminate the scene.

20. The capacitive discharge flash apparatus of claim 18 wherein said charging and said selectively charging means further comprises:

a low voltage power source;

a voltage converter for converting the low voltage provided by the low voltage power source to a high voltage; and first switching means coupled to said voltage converter and selectively actuable for connecting said voltage converter to said first high voltage discharge capacitor during operation of said charging means and to said second high voltage discharge capacitor during operation of said selectively charging means.

21. A capacitive discharge flash apparatus for a camera comprising:

a first energizable flash tube arranged to project light in a first direction to directly illuminate a scene;

a second energizable flash tube arranged to project light in a second direction to indirectly illuminate the scene;

first and second high voltage discharge capacitors coupled to said first and second flash tubes, respectively;

means for charging said first high voltage discharge capacitor to a predetermined energy level;

means for detecting a user initiated interrupt signal;

means for selectively charging said second high voltage discharge capacitor to a predetermined energy level upon completion of charging of said first high voltage discharge capacitor and unless an interrupt signal is detected before completion of charging of said second high voltage discharge capacitor; and means for discharging said first and second high voltage discharge capacitors through said first and second energizable flash tubes to directly and indirectly illuminate the scene upon completion of charging of said first and second high voltage discharge capacitors; or means for discharging said first high voltage discharge capacitor through said first energizable flash tube to directly illuminate the scene upon completion of charging of said first high voltage discharge capacitor and detection of an interrupt signal prior to completion of charging of said second high voltage discharge capacitor.

22. The capacitive discharge flash apparatus of claim 21 further comprising:

means for indicating to the user the state of charging of said second high voltage discharge capacitor.

23. The capacitive discharge flash apparatus of claim 21 further comprising:

means for detecting the presence or absence of a reflective surface from which light projected by said second energizeable flash tube in said second direction may be reflected onto the scene; and means for selectively charging said second high voltage discharge capacitor to a predetermined energy level upon completion of charging of said first high voltage discharge capacitor and upon detection of the presence of a reflective surface from which light projected by said second energizable flash tube may be reflected onto said scene.

24. The capacitive discharge flash apparatus of claim 23 further comprising:

means for indicating to the user the state of charging of said second high voltage discharge capacitor.

25. The capacitive discharge flash apparatus of claim 21 wherein said charging and said selectively charging means further comprises:

a low voltage power source;

a voltage converter for converting the low voltage provided by the low voltage power source to a high voltage; and first switching means coupled to said voltage converter and selectively actuable for connecting said voltage converter to said first high voltage discharge capacitor during operation of said charging means and to said second high voltage discharge capacitor during operation of said selectively charging means.

* * * * *